(12) United States Patent
Clatty et al.

(10) Patent No.: US 6,448,364 B1
(45) Date of Patent: Sep. 10, 2002

(54) IMR HAVING SYNERGISTIC EFFECT WITH STABILIZING SYSTEM ADDITIVES AND CATALYST PACKAGE

(75) Inventors: Jan L. R. Clatty, Moon Township, PA (US); Michael T. Wellman, Moundsville, WV (US); Stephen J. Harasin, Morgan, PA (US)

(73) Assignee: Bayer Corporation, Pittsburgh, PA (US)

( * ) Notice: Subject to any disclaimer, the term of this patent is extended or adjusted under 35 U.S.C. 154(b) by 30 days.

(21) Appl. No.: 09/811,030

(22) Filed: Mar. 16, 2001

(51) Int. Cl.⁷ .............................................. C08G 18/32
(52) U.S. Cl. ........................ 528/61; 524/779; 528/64; 528/76; 528/77; 528/78; 264/328.1
(58) Field of Search ............................ 524/779; 528/64, 528/61, 78, 76, 77; 264/328.1

(56) References Cited

U.S. PATENT DOCUMENTS

| | | | |
|---|---|---|---|
| 3,726,952 A | 4/1973 | Boden et al. .................. 264/48 |
| 3,875,069 A | 4/1975 | Worschech et al. ....... 252/56 S |
| 4,058,492 A | 11/1977 | von Bonin et al. ... 260/2.5 AM |
| 4,098,731 A | 7/1978 | von Bonin et al. ........... 521/51 |
| 4,111,861 A | 9/1978 | Godlewski .................. 521/123 |
| 4,201,847 A | 5/1980 | Kleimann et al. .......... 521/172 |
| 4,254,228 A | 3/1981 | Kleinmann et al. ......... 521/128 |
| 4,519,965 A | 5/1985 | Taylor et al. ................. 264/51 |
| 4,581,386 A | 4/1986 | Taylor et al. ................ 521/125 |
| 4,585,803 A | 4/1986 | Nelson et al. ............... 521/105 |
| 4,764,537 A | 8/1988 | Horn et al. .................... 521/51 |
| 5,137,788 A | 8/1992 | Clatty et al. ................. 428/457 |
| 5,389,696 A | 2/1995 | Dempsey et al. ........... 521/128 |
| 5,500,176 A | 3/1996 | Parks et al. ................. 264/257 |
| 5,670,553 A | 9/1997 | Mackey ...................... 521/128 |

FOREIGN PATENT DOCUMENTS

| | | |
|---|---|---|
| EP | 119471 | 3/1994 |
| GB | 101140 | 1/1983 |

*Primary Examiner*—Rachel Gorr
(74) *Attorney, Agent, or Firm*—Joseph C. Gil; N. Denise Brown

(57) ABSTRACT

This invention relates to a process for the production of a polyurethane elastomer by reacting a reaction mixture comprising (A) an isocyanate-reactive component having a molecular weight of 400 to 12,000, a functionality of about 2 to about 8 and being capped with 13 to 21% by weight of ethylene oxide, wherein the isocyanate-reactive groups are hydroxyl groups, amine groups or mixtures thereof; (B) an isocyanate-reactive component comprising (1) an isocyanate-reactive component containing at least two hydroxyl groups and having a molecular weight of from 62 to 399, and (2) an isocyanate-reactive component selected from the group consisting of (a) an isocyanate-reactive group containing tertiary amine polyether corresponding to a specific formula, (b) at least one organic amine compound containing at least two amine groups which are reactive with isocyanate groups; (C) potassium halide; (D) an internal mold release agent; (E) at least one catalyst, and (F) a polyisocyanate component.

21 Claims, No Drawings

IMR HAVING SYNERGISTIC EFFECT WITH STABILIZING SYSTEM ADDITIVES AND CATALYST PACKAGE

BACKGROUND OF THE INVENTION

This invention relates to a process for the production of a RIM part which exhibits improved mold release capabilities due to an internal mold release (IMR) agent and provides a molded part that is readily paintable. This process comprises reacting a specific reaction mixture which contains a polyisocyanate component with an isocyanate-reactive component, potassium halide, an internal mold release agent and a catalyst via the one-shot process as an isocyanate index of from 90 to 120.

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester. U.S. Pat. No. 4,111,861 describes four different classes of internal mold releases; i) mixtures of aliphatic or aryl carboxylic acid and a polar metal compound; ii) carboxyalkyl-siloxanes; iii) aliphatic glyoximes; and iv) aralkyl ammonium salts. Other known release agents include salts of acids (such as oleic acid) and primary amines (see, U.S. Pat. No. 3,726,952), reaction products of long chain fatty acids and ricinoleic acid (see, U.S. Pat. No. 4,058,492), and salts of acids (such as oleic acid) and tertiary amines (see, U.S. Pat. No. 4,098,731).

Zinc carboxylates containing from 8 to 24 carbon atoms per carboxylate group have also been described (U.S. Pat. Nos. 4,519,965, 4,581,386, 4,585,803 and 4,764,537, and British Patent 2,101,140). Release agents containing zinc carboxylates in combination with primary or secondary amine compatibilizers and an organic material containing a carboxylic acid group, a phosphorous containing acid group or a boron containing acid group, are described in published European Patent Application 0,119,471.

U.S. Pat. No. 3,875,069 discloses lubricant compositions which are said to be useful in the shaping of thermoplastic materials, These lubricant materials comprise (A) mixed esters with hydroxyl and acid numbers of 0 to 6 and (a) alkane polyols, (b) a dicarboxylic acid, and (c) aliphatic hydrocarbon monocarboxylic acids, said mixed esters having a molecular weight of at least 524; and (B) esters selected from the group consisting of (1) esters of the dicarboxylic acids of (A)(b) and aliphatic monofunctional alcohols, (2) esters of aliphatic monofunctional alcohols and aliphatic hydrocarbon monocarboxylic acids, and (3) complete esters or partial esters of alkanepolyols and aliphatic hydrocarbon monocarboxylic acids, with the ratio of by weight of (A) to (B) being from 1:3 to 9:1.

U.S. Pat. Nos. 5,389,696 and 5,500,176 describe processes for the production of molded products using internal mold release agents. These processes comprise reacting a reaction mixture of an organic polyisocyanate, and at least one organic compound containing isocyanate-reactive hydrogen atoms, in the presence of a catalyst and the IMR in a closed mold. Suitable IMRs comprise a) mixed esters comprising the reaction product of i) aliphatic dicarboxylic acids, ii) aliphatic polyols, and iii) monocarboxylic acids with 12 to 30 carbon atoms in the molecule. In U.S. Pat. No. 5,389,696, the IMR may additionally comprise b) a compound comprising the reaction product of i) N,N-dimethylpropylene diamine with ii) a compound selected from the group consisting of tall oil, $C_8-C_{20}$ monofunctionalic carboxylic acids, and mixtures of $C_8-C_{20}$ monofunctional carboxylic acids; and c) a compound comprising the reaction product of oleic acid, adipic acid and pentaerythritol. In U.S. Pat. No. 5,500,176, the reaction mixture may additionally include a fatty acid such as oleic acid. Molded parts having a density of 0.25 to 1.25 g/cc are described by U.S. Pat. No. 5,389,696 and molded parts having a density of 1.3 to 2.0 g/cc are described by U.S. Pat. No. 5,500,176.

Internal mold release systems for SRIM processes are also described by U.S. Pat. No. 5,670,553. These comprise (a) a carboxylic acid and (b) a compound selected from the group consisting of a fatty polyester, a fatty acid ester and a fatty amide. Suitable fatty polyesters comprise the reaction product of (i) aliphatic dicarboxylic acids, (ii) aliphatic polyols and (iii) fatty monocarboxylic acids wherein the monocarboxylic acid contains from about 12 to 30 carbon atoms. These preferably comprise (i) adipic acid, (ii) pentaerythritol, and (iii) oleic acid.

Improved thermal break systems utilizing a NCO prepolymer of a polyisocyanate and optimization of the % NCO or urethane content of the NCO prepolymer to obtain optimum impact properties or reduced brittleness of the final urethane are described by U.S. Pat. No. 5,137,788. This patent described homogeneously storable mixtures which produce shrink stable urethanes having good adhesion properties with respect to metal substrates. These homogeneously storable mixtures comprise a small quantity of a potassium halide in a mixture of (a) polyoxyalkylene polyols, polyolamines and/or polyamines having molecular weights of 400 to 12,000 and a functionality of at least about 2.0, with (b) low molecular weight polyols containing at least two hydroxyl groups and having a molecular weight of from 62 to 399. At least one compound in group (a) must have a functionality of at least about 3 in a quantity such that the total functionality of the polyol mixtures is at least about 3.

The present invention is directed to molded products made using the reaction injection molding (RIM) process. The materials are elastomeric in nature and comprise an IMR and stabilizing agents. The elastomer compositions are designed to exhibit extended gel times of 5–20 seconds. This reaction time is much longer than typical RIM elastomer systems, being 0.9 to 1.4 seconds. This reaction time allows longer pour times but also excludes the use of historically known IMRs for release improvements due to their negative effect on activity or release. Therefore, the objective of the present invention was to find a composition that would provide the same release performance as existing technology yet offer a greater processing window and larger molded part application opportunities with existing equipment. It has been found possible by the use of an isocyanate-reactive component capped with polyethylene oxide and an internal stabilizer IMR package which synergistically works together to give release performance comparable to historic performance while maintaining extended gel reactivities.

Advantages of the present invention include easier release of parts from a mold as well as multiple releases of parts without reapplication of external release agents between moldings while maintaining the extended reaction times the elastomer has with the use of this synergistic IMR package.

SUMMARY OF THE INVENTION

This invention relates to a process for the production of a polyurethane elastomer from a reaction mixture by the reaction injection molding process. Suitable reaction mixtures for this process comprise:

(A) an isocyanate-reactive component containing at least two isocyanate-reactive groups, having a molecular weight of from 400 to 12,000, a functionality of from about 2 to about 8, and being capped with from about 13 to about 21% by weight (based on 100% by weight of the alkylene oxide groups) of ethylene oxide, wherein said isocyanate-reactive groups being selected from the group consisting of hydroxyl groups, amine groups, and mixtures thereof;

(B) an isocyanate-reactive component comprising:
  (1) an isocyanate-reactive component containing at least two hydroxyl groups and having a molecular weight of from 62 to 399, and
  (2) an isocyanate-reactive component selected from the group consisting of:
    (a) an isocyanate-reactive tertiary amine polyether having a functionality of at least two and a molecular weight of 62 to 399 and corresponding to the general formula:

$R(NR^1R^2)_m$ wherein:
      R: represents a saturated or unsaturated $C_2$–$C_8$ aliphatic or $C_2$–$C_8$ aliphatic substituted with —OH, —SH, or —NHR$^a$ wherein R$^a$ is a $C_1$–$C_8$ alkyl or $C_2$–$C_8$ alkenyl; saturated or unsaturated $C_5$–$C_8$ cycloaliphatic or $C_5$–$C_8$ cycloaliphatic substituted with $C_1$–$C_8$ alkyl, $C_2$–$C_8$ alkenyl, $C_1$–$C_8$ alkylene, —OH, —SH or —NHR$^a$ wherein R$^a$ is $C_1$–$C_8$ alkyl or $C_2$–$C_8$ alkenyl; or five- or six-membered aromatic or heteroaromatic optionally substituted with $C_1$–$C_8$ alkyl, $C_1$–$C_8$ alkoxy, halogen, cyano, nitro, $C_1$–$C_8$ alkylene, —OH, —SH, or —NHR$^a$ wherein R$^a$ is $C_1$–$C_8$ alkyl or $C_2$–$C_8$ alkenyl;
      $R_1$ and $R_2$: each independently represent polyether groups terminated with isocyanate-reactive groups selected from —OH, —SH and —NHR$^b$ wherein R$^b$ is a $C_1$–$C_8$ alkyl or $C_2$–$C_8$ alkenyl; and
      m: represents an integer of from 1 to 4;
    (b) at least one organic amine compound containing at least one amino group having a moderated reactivity toward the organic polyisocyanate, as indicated by a gel time exceeding about 5 seconds measured from the material initiation time at 25–40° C., and having a number average molecular weight of from 62 to 399, said organic amine being selected from the group consisting of:
      (1) a sterically hindered aromatic amine in which one or more aromatic ring substituents are situated ortho to the amino groups,
      (2) an aromatic amine other than amine (B)(2)(b)(1) in which at least one of the amine groups exhibits reduced reactivity due primarily to electronic effects rather than steric factors,
      (3) an aromatic or non-aromatic amine having secondary amine groups,
      (4) a non-aromatic amine having sterically hindered primary amine groups, and
      (5) mixtures thereof;
    (c) at least one aminoalcohol having a molecular weight of 62 to 399 and containing at least one amine group and at least one hydroxyl group, and
    (d) mixtures thereof;

(C) potassium halide;

(D) an internal mold release agent comprising:
  (1) from 1 to 10% by weight, based on the weight of said reaction mixture, of mixed esters comprise the reaction product of
    (a) aliphatic dicarboxylic acids,
    (b) aliphatic polyols, and
    (c) monocarboxylic acids with 12 to 30 carbon atoms in the molecule,
    wherein said reaction product has an acid number of less than 25 and a hydroxyl number of less than 25; and (E) at least one catalyst; and (F) a polyisocyanate component selected from the group consisting of a diphenylmethane diisocyanate, a modified diphenylmethane diisocyanate, an NCO prepolymer formed from a diphenylmethane diisocyanate, and mixtures thereof.

The present invention also relates to the use of other additives which may be used and do not alter the release performance. These include, but are not limited to, fillers, pigments, surfactants and combustion modifiers known for use in polyurethane chemistry and other areas of chemistry.

DETAILED DESCRIPTION OF THE INVENTION

Suitable isocyanate-reactive compounds to be used as component (A) in the present invention include those compounds containing at least two isocyanate-reactive groups, having a molecular weight of from 400 to 12,000, a functionality of from about 2 to about 8, and being capped with from about 13 to 21% by weight of ethylene oxide (based on 100% by weight of alkylene oxide groups). The isocyanate-reactive groups are selected from the group consisting of hydroxyl groups, amine groups and mixtures thereof.

These relatively high molecular weight polyols include linear or branched, di-, tri-, tetra- or higher functional polyoxyalkyene polyols (polyalkylene oxide polyols) having molecular weight of from 400 to 12,000, preferably from 800 to 10,000 and more preferably from 1,000 to 8,000. The polyols preferably have OH numbers of from 20 to 112. These polyoxyalkylene polyols may be obtained by the addition of alkyloxiranes, such as propylene oxide, ethylene oxide, epichlorohydrin, 1,2- or 2,3-butylene oxide and/or styrene oxide onto difunctional or higher functionality starters, such as water, diols, triols or tetra hydroxy polyols, polyesters, ammonia, amines, di- or polyamines, aminoalcohols, hydrazine or similar compounds. Mixtures of alkyloxiranes (for examples, of propylene oxide and epichlorohydrin) may also be used for producing the polyoxyalkylene polyols.

Polyoxyalkylene polyols which contain predominantly terminal oxyethylene blocks, preferably in quantities of from 10 to 50% by weight, and more preferably in quantities of from 13 to 21% by weight, based on the sum or all the oxyalkylene units present in the polyoxyalkylene polyol are particularly suitable for the present invention. The remaining oxyalkylene radicals are preferably oxypropylene radicals. These polyoxyalkylene-oxyalkylene polyols are generally 2- to 8-functional and preferably di-, tri- or tetra-functional, most preferably di- to tri-functional polyoxyalkylene polyols. Technically, the most important polyoxyalkylene polyols are the polyoxypropylene polyols which contain from 13% to 21% by weight, preferably from 15% to 21% by weight, and more preferably, from 16% to 21% by weight of predominantly terminal oxyethylene blocks and which have a functionality of from about 2 to about 3.

Other polyoxyalkylene polyether polyols (diols or triols) are those which contain predominantly or exclusively internal oxyethylene blocks in quantities of 5% to 80% by weight, and at the same time contain terminal oxyethylene units in quantities of 10% to 50% by weight, in which the remaining oxyalkylene groups are oxypropylene groups.

The polyalkylene polyether polyols can also be used in the form of mixtures.

In the preferred polyether polyols described above, the oxyethylene content should be such that at room temperature the polyether polyol is liquid or the non-oxyethylene content in the polyether polyol should be selected so that a liquid is obtained.

The polyoxyalkylene polyols may be produced in known manner by the polymerization of alkyloxiranes or mixtures thereof or by their addition onto starter components containing reactive hydrogen (such as water, ethylene glycol, 1,2- or 1,3-propane diol, dipropylene glycol, 1,4- or 3,6-dianhydrosorbitol, trimethylol propane, glycerol, pentaerythritol, sorbitol, sucrose, 4,4'-dihydroxydiphenyl propane, aniline, ethanolamine, or ethylene diamine), optionally, in the presence of acidic or, preferably basic catalysts. The polymerization process is optionally carried out in a mixture with ethylene oxide, but preferably in stages with addition of the ethylene oxide in the final stage being preferred, or in stepwise reactions, in a manner such that the above-described polyols are formed. Some of the oxyethylene sequences or blocks may also be present within the polyethers, although for the most part, they should be terminally arranged.

Production, properties and specific examples of polyethers of this type are described in Ullmanns Enzyklopadie der Technischen Chemie, Verlag Chemie, Weihheim $4^{th}$ Edition, Vol. 19 (1981), in the chapter on polyalkylene glycols (pages 31 to 38) and in the chapter on polyurethanes (pages 301 to 341, more particularly pages 304 to 308). They are also discussed in Kunststoff-Handbuch, Vol. VII, Polyurethane, Carl Hanser Verlag, Munich, $1^{st}$ Edition (1966), pages 61 to 75 and $2^{nd}$ Edition (1983) pages 42 to 54 and pages 75 to 77.

Compounds containing at least two hydroxyl groups and having a molecular weight of from 62 to 399 and preferably from 62 to 254 may be used as component (B)(1) of the present invention. These polyols show little, if any, miscibility in the high molecular weight polyoxyalkylene polyols in the absence of some type of compatibility promoting material such as the potassium halides required as component (C) of the present invention.

Appropriate low molecular weight polyols include, for examples, diols or mixtures of diols, preferably straight-chain or branched-chain (cyclo)alkylene diols, such as ethylene glycol, 1,2-propane diol, 1,3-propane diol, 3-chloro-2-propane diol, 1,4-butane diol, 1,4-dihydroxy cyclohexane, 1,4-dihydroxy methyl cyclohexane, 2-butene-1,4-diol, (cyclo)aliphatic triols such as glycerol, trimethylol ethane, 1,2,6-hexane triol, trimethylol propane or 1,2,4-butane triol and the propoxylation and ethoxylation products of these triols with molecular weight of up to 399, polyols such as bis- and tris-tri-methylol propane, pentaerythirtol and their mono- and oligoethyoxylation products; also the bis-propoxylation or bis-ethoxylation products of aromatic phenols, preferably bis-(4-hydroxyl-phenyl)-dimethyl methane or hydroquinone. Formoses and formitols having molecular weights of up to 399 are also suitable. Ethylene glycol, dipropylene glycol and/or 1,4-butane diol are preferred. However, ethylene glycol is the most preferred.

Suitable compounds to be used as isocyanate-reactive tertiary amine polyethers, i.e. component (B)(2)(a) of the present invention, include compounds having the formula:

wherein R, $R^1$, $R^2$, and m have the meanings given hereinabove.

The term "saturated or unsaturated $C_2$–$C_8$ aliphatic" as applied to group R of component (B)(2)(a) refers to straight or branched chain hydrocarbon groups having from 2 to 8 carbon atoms attached to form 1 to 4—$NR^1R^2$ groups (preferably such that no carbon atoms is attached to two nitrogen atoms) and optionally containing carbon-carbon double bonds (with the proviso that no double-bonded carbon atom is attached directly to a nitrogen atom). For example, when m is 2, saturated or unsaturated $C_2$–$C_8$ aliphatic groups include linear ethylene, propylene, butylene, pentylene, hexylene, heptylene, and octylene groups, as well as the isomeric branched forms thereof. The term "saturated or unsaturated $C_5$–$C_8$ cycloaliphatic" as applied to group R of component (B)(2)(a) refers to cyclopentane, cyclohexane, cycloheptane, and cyclooctane groups, as well as to $C_1$–$C_8$ alkyl derivatives thereof, that are attached to the —$NR^1R^2$ groups either directly to the ring carbon atoms or indirectly through the optional $C_1$–$C_8$ alkylene substituents (preferably such that no carbon atom is attached directly to two nitrogen atoms) and that optionally contain carbon-carbon double bonds in the cyclic moiety (preferably such that no double-bonded carbon atom is attached directly to a nitrogen atom). For example, when m is 2, preferred saturated or unsaturated $C_5$–$C_8$ cycloaliphatic groups include the various isomeric cyclopentylene, cyclohexylene, cycloheptylene, and cyclooctylene groups. Suitable but less preferred saturated or unsaturated $C_5$–$C_8$ cycloaliphatic groups include those in which at least one ring carbon atom is attached to the —$NR^1R^2$ groups indirectly through an optional $C_1$–$C_8$ alkylene substituent, such as groups in which m is 2 having the formulas:

and the like. The term "five- or six-membered aromatic or heteroaromatic" as applied to group R of component (B)(2)(a) refers to benzene, six-membered heterocyclic groups containing at least one ring nitrogen atom (such as pyridine, pyrazine, pyrimidine, pyridazine, and the like), five-membered heterocyclic groups containing at least one ring nitrogen, oxygen, or sulfur atom (such as, furan, pyrrole, imidazole, pyrazole, thiophene, oxazole, isoxazole, thiazole, isothiazole, and the like), each of which can be substituted with $C_1$–$C_8$ alkyl, $C_1$–$C_8$ alkoxy, halogen, cyano, nitro, or $C_1$–$C_8$ alkylene. When the substituent is $C_1$–$C_8$ alkylene, the aromatic or heteroaromatic group can be attached to the —$NR^1R^2$ groups indirectly through the alkylene substituents.

Each group R can optionally be substituted with —OH, —SH, or —$NHR^a$ groups wherein $R^a$ is $C_1$–$C_8$ alkyl or $C_2$–$C_8$ alkenyl (preferably alkenyl in which no double-bonded carbon atom is attached directly to a nitrogen atom), particularly when m is 1, to provide additional isocyanate-reactive sites. Examples of suitable such groups R when m is 1 include hydroxyethyl and hydroxypropyl. Such groups are generally not preferred when m is 2, 3 or 4.

The term "polyether groups terminated with isocyanate-reactive groups" as applied to groups $R^1$ and $R^2$ of component (B)(2)(a) refers to polyethers prepared, for example, by the general methods described above for preparing isocyanate-reactive component (A), provided that one end of each polyether chain is attached to the nitrogen atom indicated in the formula and the other end is terminated by at least one —OH, —SH, or —NHR$^b$ group, and that the molecular weight of the resultant tertiary amine polyether (B)(2)(a) ranges from about 62 to about 399. Suitable polyethers include hydroxy-terminated polyoxyalkylene polyethers, such as those having polyoxyethylene, polyoxypropylene, polyoxybutylene, or polytetramethylene groups, especially hydroxy-terminated polyoxypropylene groups.

Particularly preferred isocyanate-reactive tertiary amine polyethers (B)(2)(a) are those in which R is a difunctional saturated $C_2$–$C_8$ aliphatic groups, $R^1$ and $R^2$ are independently hydroxy-terminated polyethers containing exclusively polypropylene oxide units, and m is 2, and in which the molecular weight is from 62 to 399.

Suitable compounds to be used as component (B)(2)(b) in the present invention include those organic amines containing at least one amine groups that exhibits an attenuated reactivity toward organic polyisocyanates, as indicated by gel times exceeding about 5 seconds (preferably 10 to 45 seconds) as measured from the material initiation (cream) time at 25–40° C. Reactivities of the attenuated-reactivity amino groups can be moderated by steric effects and/or electronic effects. Compare U.S. Pat. No. 5,334,673.

Suitable amines include sterically hindered aromatic amines (B)(2)(b)(1) in which one or more aromatic ring substituents (preferably $C_1$–$C_6$ alkyl groups) are situated ortho to the amino groups. It is, of course, possible for such compounds to include substituents that inhibit reactivity by electronic effects. Examples of such hindered aromatic amines include diamines such as 1-methyl-3,5-bis (methylthio)-2,4- and/or -2,6-diamino-benzene, 1,3,5-triethyl-2,4-diaminobenzene, 1,3,5-triisopropyl-2,4-diaminobenzene, 1-methyl-3,5-diethyl-2,4- and/or 2,6-diaminobenzene (DETDA), 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodiphenylmethane, and 3,5-diethyl-3',5'-diisopropyl-4,4'-diaminodiphenylmethane.

Suitable diamines (B)(2)(b) also include other aromatic amines (B)(2)(b)(2) in which reactivity is primarily determined by electronic effects rather than steric factors. It is, of course, possible for such compounds to include sterically hindered amino groups as well. Examples of suitable aromatic amines include those containing deactivating substituents (such as halogens, nitro or carbonyl groups), especially diamines such as halogenated diaminodiphenylmethanes (for example, 3,3'-dichloro-4,4'-diaminodiphenylmethane (MOCA) and 3-chloro-4,4'-diaminodiphenylmethane (in which the amino group attached to the chlorinated aromatic ring is left exposed )), and 4-(4'-aminobenzyl) cyclohexylamine (1/2 PACM).

Examples of aromatic or non-aromatic amines (B)(2)(b) (3) having secondary amino groups include N,N'-dialkyl-p-phenylenediamines, N,N'-dialkylaminodiphenylmethanes, and piperzine or sterically hindered derivatives thereof.

Examples of non-aromatic amines suitable as component (B)(2)(b)(4) having sterically hindered primary amino groups include 2-methyl-2-amino-propanol.

Suitable potassium halides to be used as component (C) in the present invention include, for example, potassium chloride, potassium bromide, potassium iodide, and potassium fluoride. Potassium chloride and potassium bromide are preferred. These promote solubility among the isocyanate-reactive components.

The potassium salt is generally used in a quantity such that there are from 0.005 to 33.3 parts of salt, preferably from 1.23 to 4.76 parts, most preferably from 1.96 to 3.38 parts of salt for every 100 parts of low molecular weight polyoxyalkylene polyol and/or polyamine, i.e. component (B). Where the salt used is relatively difficult to dissolve (i.e. where less than 10 parts of salt dissolve in the low molecular weight polyol), the quantity dissolved preferably corresponds to the maximum solubility of the particular salt.

The necessary quantity of solution-promoting potassium salt depends upon the quantity of oxyethylene groups in the polyether and also upon the type and quantity of diols added. In general, the lower the oxyethylene content and the higher the content of added diols, the more solution-promoting salt will be required.

In general, the potassium solution-promoting salt is dissolved in the low molecular weight polyol component, optionally with heating. The resulting solution is then combined with the high molecular weight polyoxyalkylene component and with other optional components. The solution promoting additive must be highly soluble even in admixture with the high molecular weight polyoxyalkyene component. It is also possible to add solid, solution-promoting potassium halide, optionally with stirring to a two-phase mixture of the high and low molecular weight components of the mixtures of the present invention. A concentrated solution of solution-promoting potassium salt in low molecular weight polyol may also be added to a two-phase mixture of the high and low molecular weight components. Inclusion of optional components should not affect the homogeneity of the mixture of the polyoxyalkylene and low molecular weight polyol components.

The potassium salt used as solution-promoting additive is added to the polyoxyalkylene polyols or polyamines and to the low molecular weight polyols particularly when the low molecular weight polyol is immisicible with the polyoxyalkylene polyol and/or polyamine, or when the selected quantity of low molecular weight polyol is not completely miscible with the polyoxyalkylene polyol and/or polyamine.

Suitable internal mold release agents to be used as component (D) in the present invention, in amounts of from 1 to 10% by weight, preferably from 1 to 6% by weight, based on the weight of the reaction mixture, are the mixed esters comprising the reaction product of (a) aliphatic dicarboxylic acids, (b) aliphatic polyols, and (c) monocarboxylic acids with 12 to 30 carbon atoms in the molecule, wherein the reaction product has an acid number of less than 25 and a hydroxyl number of less than 25 (and preferably both are less than 15), are compounds such as those described, for example, in U.S. Pat. No. 3,875,069, the entirety of which is herein incorporated by reference. More specifically, U.S. Pat. No. 3,875,069 describes a component (A) of mixed esters which are suitable to be used in the present invention as component (D). Although these mixed esters are described in U.S. Pat. No. 3,875,069 as having acid and hydroxyl numbers of 0 to 6, this can easily be altered by one of ordinary skill in the art, for example, by modifying the quantities of the individual components relative to each other. This same U.S. Patent also describes a process of making these compounds which are suitable for use as component (D) in the present invention.

It is preferred that the compound used as component (D) in the present invention comprises the reaction product of (a) adipic acid, (b) pentaerythritol, and (c) oleic acid, wherein said reaction product has an acid number of less than 25 and a hydroxyl number of less than 25, and preferably both are less than 15. A particularly preferred compound to be used as component (D) in the present invention is Loxiol G-71S, commercially available from Henkel Corporation. U.S. Pat. No. 3,875,069 describes this compound and a process for making it.

The internal mold release agents of the present invention are used in the absence of esters selected from the group consisting of: (1) esters of (i) dicarboxylic acids and (ii) aliphatic monofunctional alcohols of 12 to 30 carbon atoms, (2) esters of (i) aliphatic monofunctional alcohols having 12 to 30 carbon atoms and (ii) aliphatic hydrocarbon monocarboxylic acids with 12 to 30 carbon atoms, and (3) complete esters or partial esters of (i) aliphatic polyols and (ii) aliphatic hydrocarbon monocarboxylic acids having 12 to 30 carbon atoms. These esters which are to be excluded from the internal mold release agent of the present invention are further described as component (B) in U.S. Pat. No. 3,875,069 at column 3, lines 36–46 and at column 7, line 1 through column 8, line 59, the disclosure of which is herein incorporated by reference.

Suitable compounds to be used as catalysts, i.e. component (E), in the present invention include tertiary amines and metal compounds known in the art. Suitable tertiary amine catalysts include triethylamine, tributylamine, N-methylmorpholine, N-ethylmorpholine, N,N,N',N'-tetramethylethylene diamine, pentamethyldiethylene triamine, and higher homologues (German Offenlegungsschriften 2,624,527 and 2,624,528), 1,4-diazabicyclo[2.2.1] octane, N-methyl-N'-(dimethylaminoethyl)-piperazine, bis (dimethylaminoalkyl)piperazines (German Offenlegungsschrift 2,636,787), N,N-dimethylcyclohexylamine, N,N-diethylbenzylamine, bis(N,N-diethyl-aminoethyl)adipate, N,N,N',N'-tetramethyl-1,3-butanediamine, N,N,-dimethyl-β-phenylethylamine, 1,2-dimethylimidazole, 2-methylimidazole, monocyclic and bicyclic amidines (German Offenlegungsschrift 1,720,633) bis(dialkylamino) alkyl esters (U.S. Pat. No. 3,330,782 and German Auslegeschrift 030,558 and German Offenlegungsschriften 1,804,361 and 2,618,280), and tertiary amines containing amide groups (preferably formamide groups) according to German Offenlegungsschriften 2,523,633 and 2,732,292. The catalysts used may also be the known Mannich bases of secondary amines (such as dimethylamine) and aldehydes (preferably formaldehyde) or ketones (such as acetone) and phenols.

Suitable catalysts also include certain tertiary amines containing isocyanate-reactive hydrogen atoms. Examples of such catalysts include thietahnolamine, triisopropanolamine, N-methyidiethanolamine, N-ethyldiethanolamine, N,N-dimethylethanolamine, their reaction products with alkylene oxides (such as propylene oxide and/or ethylene oxide) and secondary-tertiary amines according to German Offenlegungsschrift 2,732,292.

Other suitable catalysts include organic metal compounds, especially organic tin, bismuth and zinc compounds. Suitable organic tin compounds include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutyl-tin maleate, and dioctyltin diacetate. Suitable bismuth compounds include bismuth neodecanoate, bismuth versalate, and various bismuth carboxylates known in the art. Suitable zinc compounds include zinc neodecanoate and zinc-versalate. Mixed metal salts containing more than one metal (such as carboxylic acid salts containing both zinc and bismuth) are also suitable catalysts.

Another group of suitable catalysts for the present invention include the cyclic amines of carboxylic acid salts. Some examples of such catalysts are UAX 1077, a cyclic amine/ formic acid salt in ethylene glycol, commercially available from OSi; Polycat SA-102, a cyclic amine blocked with 2-ethylhexanoic acid, commercially available from Air Products; Polycat SA-610/50, a cyclic amine blocked with formic acid in dipropylene glycol, commercially available from Air Products; Desmorapid DB or N,N-dimethylbenzylamine, commercially available from Rhein-Chemie; Jeffcat M-75, a mixture of cyclic amines in diethylene glycol monobutyl ether, commercially available from Huntsman; Jeffcat ZF-52, a mixture of bis-(2-dimethylaminoethyl)ether and N,N-dimethylethanolamine (i.e. Jeffcat DMEA), in propylene glycol and partially neutralized with formic acid, commercially available from Hunstman; Jeffcat DMP, N,N'dimethylpiperazine, commercially available from Hunstman; etc. Any of the abovementioned catalysts may, of course, be used as mixtures.

Further representatives of catalysts to be used according to the invention and details concerning their mode of action are described in Kunstoff Handbuch, Volume VII, published by Vieweg and Hochtlen, Carl-Hanser-Verlag, Munich, 1966, for example, on pages 96–102.

Suitable surfactants (or surface-active agents) to be used in the presently claimed invention include, for example, emulsifiers and foam stabilizers. Examples of suitable surfactants include any of several silicone surfactants known in the art (including, for example, those available commercially from Witco, Dow Corning Corporation, Union Carbide Chemical and Plastics Co., Inc., and Rhein Chemie Corporation), as well as various alkali metal or ammonium salts of sulfonic acids (e.g., of dodecyl benzene sulfonic acid or of dinaphthyl methane disulfonic acid), amine salts of fatty acids (such as diethylamine oleate or diethanolamine stearate) and sodium salts of ricinoleic acids.

If foam stabilizers are used, it is preferred that they comprise water soluble polyether siloxanes. These compounds are generally a copolymer of ethylene oxide and propylene oxide linked to a polydimethyl siloxane group. Foam stabilizers of this type are described in, for example, U.S. Pat. Nos. 2,764,565, 2,834,748, 2,917,480 and 3,629,308, the disclosures of which are herein incorporated by reference. Examples of some particularly useful surfactants include DC-193 (commercially available from Dow Corning), L-5340 (commercially available from Witco), L-1000 (commercially available from Witco), etc. Also useful are the known polysiloxane surfactants generally used in the polyurethane art.

Suitable polyisocyanates which can be used as component (F) in the present invention include those commonly used for the production of polyurethane systems such as diphenylmethane-4,4'- and/or -2,4'- and/or -2,2'-diisocyanate (MDI); and the technical polyphenyl-polymethylene polyisocyanates obtained by phosgenating aniline-formaldehyde condensates and described, for example, in British Patent No. 874,430, and 848,671 (MDI containing polynuclear polyisocyanates). The modified polyisocyanates obtained by the modification of MDI, for example, polyisocyanates modified with polyols through urethane groups, carbodiimide polyisocyanates, isocyanurate polyisocyanates, biuretized polyisocyanates, allophanatized polyisocyanates or uretdione polyisocyanates are examples of suitable modified technical isocyanates.

Allophanate-modified polyisocyanates which are suitable for the present invention include, for example, those which are known and described in, for example, U.S. Pat. Nos. 4,810,820, 5,124,427, 5,208,334, 5,235,018, 5,444,146, 5,614,605, 5,663,272, 5,783,652, 5,789,519, 5,859,163, 6,028,158, 6,063,891, the disclosures of which are herein incorporated by reference.

In a preferred embodiment of the invention, the polyisocyanate used in an NCO-prepolymer of a polyisocyanate such as those described above and an isocyanate-reactive compound such as the relatively high molecular weight polyols described above. Preferred prepolymers are formed by reacting MDI with a high molecular weight polyol in quantities such that the NCO content is from about 10 to 30%, preferably from about 15 to 30%, and most preferably from about 20 to 30%.

Fillers and reinforcing agents are also suitable for use in the presently claimed invention. Suitable fillers and reinforcing agents include both organic and inorganic compounds. These inorganic compounds include, for example, compounds such as glass in the form of fibers, flakes, cut fibers, mats, or microspheres; mica, wollastonite; carbon fibers; carbon black; talc; and calcium carbonate. Suitable organic compounds include, for example, expanded microspheres which are known and described in, for example, U.S. Pat. Nos. 4,829,094, 4,843,104, 4,902,722 and 5,244,613, the disclosures of which are herein incorporated by reference. These include commercially available microspheres such as, for example, Dualite M6017AE, Dualite M6001AE and Dualite M6029AE, all of which are available from Pierce and Stevens Corporation, and Expandocel which is available from Nobel Industries.

The addition of these fillers and reinforcing agents to the reaction mixture of the presently claimed invention, make the molded parts suitable for us in RRIM (i.e. reinforced reaction injection molding) and SRIM (i.e. structural reaction injection molding) applications.

RRIM and SRIM are both methods of producing molded parts by reacting an isocyanate with a mixture containing isocyanate-reactive hydrogens via the conventional RIM process. In the SRIM process, a reinforcing mat is preplaced in the molding tool and the reactive mixture is injected into it. In the RRIM process, reinforcing fibers or fillers are mixed into one or both components, i.e. the isocyanate component and/or the mixture containing the isocyanate-reactive component, before the components are mixed with the RIM process.

In addition to the catalysts, surface-active agents, and fillers and reinforcing agents, other additives which may be used in the molding compositions of the present invention include known cell regulators, flame retarding agents, plasticizers, dyes, external mold release agents, etc.

It has been found that the particular combinations of materials described hereinabove give excellent release from a variety of different mold surfaces, such as steel or aluminum. As is typical in the industry, an application of paste wax is applied to the surface of the mold. Conventional paste waxes are commercially available, for example, from Chem-Trend, Inc. and Huron Technologies. One such example is RCT-C-2080. The paste wax fills the pores of the tool and forms a barrier coat to keep the urethane/urea from sticking to the tool. Without the use of IMR agents, the wax would be removed with the first molded part and the following part would stick to the tool.

One spray of external mold release to the surface of the mold, followed by buffing, and then spraying lightly again, was found to further enhance the releaseability. A typical example of the conventional external mold release agents is CT-2006 which is commercially available from Chem-Trend, Inc.

It is also possible that the reaction mixture contains fillers and/or reinforcing agents in quantities up to about 30% by weight in the final urethane, and preferably from about 10 to about 25% by weight in the final urethane, based on the weight of the reaction mixture.

The compositions according to the present invention may be molded using conventional processing techniques at isocyanate indexes ranging from as low as 90 to as high as 120 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate-reactive component and any other additive which is to be included.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the working examples of the present application:

Polyol A: a glyercol started propylene oxide/ethylene oxide (82.5:17.5% by wt.) polyether polyol having an OH number of about 28 and a functionality of about 3

Chain Extender A: ethylene glycol

Crosslinker A: an ethylene diamine initiated polypropylene oxide polyether polyol having an OH number of about 630 and a functionality of about 4

Crosslinker B: an 80:20% wt. mixture of 1-methyl-3,5-diethyl-2,4-diaminobenzene and 1-methyl-3,5-diethyl-2,6-diaminobenzene Catalyst A: dibutyltin dilaurate Catalyst B: 33% triethylene diamine in dipropylene glycol Catalyst C: a cyclic amine/carboxylic acid salt IMR 1: a commercially available IMR from Henkel which comprises the reaction product of adipic acid, pentaerythritol, and oleic acid, and being characterized by an acid number of less than 15 and an hydroxyl number of less than 20

IMR 2: a zinc stearate based IMR; prepared by blending about 14% by weight of Crosslinker A with about 57% of an amine-terminated polyether polyol having a functionality of 2 and a molecular weight of 400 (commercially available as Jeffamine D400 from Hunstman Chemicals), then dissolving about 29% by weight of zinc stearate in this blend at 100° C. until gone.

KCl: potassium chloride; this component was added to the formulation by dissolving in Chain Extender A at 50–75° C. until gone.

Surfactant A: L-1000, a silicone surfactant commercially available from Witco

Isocyanate A: an isocyanate prepolymer having an NCO group content of about 23%, a viscosity of between about 500 and about 800 mPa.s at 25° C. and comprising the reaction product of about 86.8% by weight of an isocyanate and about 13.2% by weight of tripropylene glycol. The isocyanate used to prepare this prepolymer comprised 4,4'-diphenylmethane diisocyanate having an NCO content of about 33.6%, a functionality of about 2.0

Internal mold release evaluations were conducted on a high pressure RIM machine. The mold used was a small tray part which contains varying wall thickness and molded in ribs of varying thickness to simulate molding of a more difficult part. Prior to release testing, the mold was cleaned and stripped with a chemical stripper, e.g. 201B from Chem Trend or another equivalent, to remove any residue or previous mold release and urethane. A base coat of mold primer (LH 1 supplied by Huron Technologies) to seal the newly cleaned tool and the wax mold release Chem Trend 2006 was applied and buffed into the mold. A final light coat was applied and the release evaluation was begun. No other reapplication of release agent was given. The end point was determined either when the part stuck to the mold or when 40 releases were obtained. Molded parts were made using the formulations as described in Table 1 below. The number of molded panels which were released prior to failure of the IMR is recorded for each formulation.

TABLE 1

| Example | 1 | 2 | 3 | 4 | 5 | 6 |
|---|---|---|---|---|---|---|
| Polyol A | 75 | 75 | 75 | 75 | 75 | 76 |
| Chain Extender A | 22 | 22 | 22 | 22 | 22 | 20 |
| Crosslinker A | 5 | 5 | 5 | 5 | 5 | — |
| Crosslinker B | — | — | — | — | — | 3 |
| Catalyst A | 0.035 | 0.04 | 0 | 0.08 | 0.08 | 0.15 |
| Catalyst B | 0.04 | 0.04 | 0 | 0.08 | 0.08 | 0.15 |
| Catalyst C | 0.5 | 0.5 | 0.5 | 0.5 | 0.5 | 0.5 |
| IMR 1 | — | — | — | 6 | 6 | 8 |
| IMR 2 | — | 6 | 6 | — | — | — |
| KCl | 0 | 0 | 0.5 | 0 | 0.5 | 0.5 |
| Surfactant A | 1 | 1 | 1 | 1 | 1 | 1 |
| Isocyanate A | 100 | 100 | 100 | 100 | 100 | 100 |
| Isocyanate Index | 1.05 | 1.05 | 1.05 | 1.05 | 1.05 | 1.05 |
| I/R | 152/100 | 147/100 | 147/100 | 144/100 | 144/100 | 129/100 |
| No. of Panels Released (on avg.) | 6 | 12 | 3 | 18 | 40 | 40 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane elastomer from a reaction mixture by the reaction injection molding wherein the reaction mixture comprises:
   (A) an isocyanate-reactive component containing at least two isocyanate-reactive groups, having a molecular weight of from 400 to 12,000, a functionality of from about 2 to about 8, and being capped with from about 13 to about 21% by weight (based on 100% by weight of the alkylene oxide groups) of ethylene oxide, wherein said isocyanate-reactive groups being selected from the group consisting of hydroxyl groups, amine groups, and mixtures thereof;
   (B) an isocyanate-reactive component comprising:
      (1) an isocyanate-reactive component containing at least two hydroxyl groups and having a molecular weight of from 62 to 399, and
      (2) an isocyanate-reactive component selected from the group consisting of:
         (a) an isocyanate-reactive tertiary amine polyether having a functionality of at least two and a molecular weight of 62 to 399 and corresponding to the general formula:

$R(NR^1R^2)_m$ wherein:
   R: represents a saturated or unsaturated $C_2$–$C_8$ aliphatic or $C_2$–$C_8$ aliphatic substituted with —OH, —SH, or —NHR$^a$ wherein R$^a$ is a $C_1$–$C_8$ alkyl or $C_2$–$C_8$ alkenyl; saturated or unsaturated $C_5$–$C_8$ cycloaliphatic or $C_5$–$C_8$ cycloalliphatic substituted with $C_1$–$C_8$ alkyl, $C_2$–$C_8$ alkenyl, $C_1$–$C_8$ alkylene, —OH, —SH or —NHR$^a$ wherein R$^a$ is $C_1$–$C_8$ alkyl or $C_2$–$C_8$ alkenyl; or five- or six-membered aromatic or heteroaromatic optionally substituted with $C_1$–$C_8$ alkyl, $C_1$–$C_8$ alkoxy, halogen, cyano, nitro, $C_1$–$C_8$ alkylene, —OH, —SH, or —NHR$^a$ wherein R$^a$ is $C_1$–$C_8$ alkyl or $C_2$–$C_8$ alkenyl;
   $R_1$ and $R_2$: each independently represent polyether groups terminated with isocyanate-reactive groups selected from —OH, —SH and —NHR$^b$ wherein R$^b$ is a $C_1$–$C_8$ alkyl or $C_2$–$C_8$ alkenyl; and
   m: represents an integer of from 1 to 4;
         (b) at least one organic amine compound containing at least one amino group having a moderated reactivity toward the organic polyisocyanate, as indicated by a gel time exceeding about 5 seconds measured from the material initiation time at 25–40° C., and having a number average molecular weight of from 62 to 399, said organic amine being selected from the group consisting of:
            (1) a sterically hindered aromatic amine in which one or more aromatic ring substituents are situated ortho to the amino groups,
            (2) an aromatic amine other than amine (B)(2)(b)(1) in which at least one of the amine groups exhibits reduced reactivity due primarily to electronic effects rather than steric factors,
            (3) an aromatic or non-aromatic amine having secondary amine groups,
            (4) a non-aromatic amine having sterically hindered primary amine groups, and
            (5) mixtures thereof;
         (c) at least one aminoalcohol having a molecular weight of 62 to 399 and containing at least one amine group and at least one hydroxyl group, and
         (d) mixtures thereof;
   (C) potassium halide;
   (D) an internal mold release agent comprising:
      (1) from 1 to 10% by weight, based on the weight of said reaction mixture, of mixed esters comprise the reaction product of (a) aliphatic dicarboxylic acids,
(b) aliphatic polyols, and
(c) monocarboxylic acids with 12 to 30 carbon atoms in the molecule,
wherein said reaction product has an acid number of less than 25 and a hydroxyl number of less than 25; and (E) at least one catalyst; and (F) a polyisocyanate component selected from the group consisting of a diphenylmethane diisocyanate, a modified diphenylmethane diisocyanate, an NCO prepolymer formed from diphenylmethane diisocyanate, and mixtures thereof.

2. The process of claim 1, wherein (A) said isocyanate-reactive component comprises a polyol having a molecular weight of from 800 to 10,000, and is capped with from about 13 to about 21% by weight of ethylene oxide.

3. The process of claim 1, wherein (A) said isocyanate-reactive component comprises polyoxypropylene polyols containing from 13 to 21% by weight of predominantly terminal oxyethylene blocks and have a functionality of from about 2 to about 3.

4. The process of claim 1, wherein (B)(1) said isocyanate-reactive component containing at least two hydroxyl groups has a molecular weight of from 62 to 254.

5. The process of claim 4, wherein (B)(1) said isocyanate-reactive component is selected from the group consisting of ethylene glycol, dipropylene glycol, 1,4-butanediol and mixtures thereof.

6. The process of claim 1, wherein (C) said potassium halide is selected from the group consisting of potassium chloride or potassium bromide.

7. The process of claim 1, wherein (C) said potassium halide is present in an amount such that there are from 0.005 to 33.3 parts of salt for every 100 parts of component (B).

8. The process of claim 1, wherein (D)(1) said internal mold release agent is present in an amount of from 1 to 6% by weight, based on the weight of the entire reaction mixture.

9. The process of claim 1, wherein (D)(1) said internal mold release agent is characterized by an acid number of less than 15 and a hydroxyl number of less than 20.

10. The process of claim 1, wherein (D)(1) said internal mold release agent comprises the reaction product of (a) adipic acid, (b) pentaerythritol and (c) oleic acid.

11. The process of claim 1, wherein (E) said catalyst comprises a mixture of at least one amine catalyst and at least one tin catalyst.

12. The process of claim 11, wherein said amine catalyst comprises one or more cyclic amines of carboxylic acid salts.

13. The process of claim 12, wherein said cyclic amine of a carboxylic acid salt is selected from the group consisting of a cyclic amine of formic acid salt; a cyclic amine blocked with 2-ethylhexanoic acid; a cyclic amine blocked with formic acid; N,N-dimethylbenzylamine; a mixture of cyclic amines in diethylene glycol monobutyl ether; a mixture of bis-(2-dimethylaminoethyl)-ether and N,N-dimethylethanolamine in propylene glycol and partially neutralized with formic acid; N,N'-dimethylpiperazine; and mixtures thereof.

14. The process of claim 1, wherein (E) said catalyst comprises one or more cyclic amines of carboxylic acid salts.

15. The process of claim 14, wherein (E) said catalyst is selected from the group consisting of a cyclic amine of formic acid salt; a cyclic amine blocked with 2-ethylhexanoic acid; a cyclic amine blocked with formic acid; N,N-dimethylbenzylamine; a mixture of cyclic amines in diethylene glycol monobutyl ether; a mixture of bis-(2-dimethylaminoethyl)-ether and N,N-dimethylethanolamine in propylene glycol and partially neutralized with formic acid; N,N'-dimethylpiperazine; and mixtures thereof.

16. The process of claim 1, wherein said reaction mixture additionally comprises at least one surfactant.

17. The process of claim 16, wherein said surfactant comprises one or more water soluble polyether siloxanes.

18. The process of claim 17, wherein said surfactant comprises a copolymer of ethylene oxide and propylene oxide linked to a polydimethyl siloxane group.

19. The process of claim 1, wherein said reaction mixture additionally comprises one or more fillers and/or one or more reinforcing agents.

20. The process of claim 1, wherein said reaction mixture is processed at an isocyanate index of about 95 to about 115.

21. The polyurethane elastomer produced by the process of claim 1.

* * * * *